United States Patent
Diroll et al.

(10) Patent No.: US 11,333,908 B2
(45) Date of Patent: May 17, 2022

(54) ULTRAFAST OPTICAL SWITCHES USING QUANTUM WELLS

(71) Applicant: UCHICAGO ARGONNE, LLC, Chicago, IL (US)

(72) Inventors: Benjamin Diroll, Chicago, IL (US); Richard D. Schaller, Clarendon Hills, IL (US)

(73) Assignee: UCHICAGO ARGONNE, LLC, Chicago, IL (US)

(*) Notice: Subject to any disclaimer, the term of this patent is extended or adjusted under 35 U.S.C. 154(b) by 561 days.

(21) Appl. No.: 16/431,777

(22) Filed: Jun. 5, 2019

(65) Prior Publication Data
US 2020/0387016 A1 Dec. 10, 2020

(51) Int. Cl.
*G02F 1/017* (2006.01)
*G02F 1/355* (2006.01)
*G02F 1/015* (2006.01)

(52) U.S. Cl.
CPC ........ *G02F 1/01716* (2013.01); *G02F 1/0157* (2021.01); *G02F 1/3556* (2013.01); *G02F 2202/106* (2013.01); *G02F 2202/107* (2013.01); *G02F 2202/108* (2013.01); *G02F 2203/01* (2013.01)

(58) Field of Classification Search
CPC ....... H04Q 11/0005; H04Q 2011/0039; H04Q 11/0015; H04B 10/67; H04B 10/70; B82Y 30/00
See application file for complete search history.

(56) References Cited

U.S. PATENT DOCUMENTS

| | | | |
|---|---|---|---|
| 5,448,080 A | 9/1995 | Han et al. | |
| 7,867,557 B2* | 1/2011 | Pickett | C09K 11/02 427/214 |
| 9,373,931 B2* | 6/2016 | Nurmikko | H01S 5/1067 |
| 10,138,134 B1 | 11/2018 | Diroll et al. | |

(Continued)

FOREIGN PATENT DOCUMENTS

CN 102749726 10/2012

OTHER PUBLICATIONS

Pelton et al. "Carrier Cooling in Colloidal Quantm Wells," Nano Letters, vol. 12, 6158-6163, 2012.

(Continued)

*Primary Examiner* — Christopher Stanford
*Assistant Examiner* — Journey F Sumlar
(74) *Attorney, Agent, or Firm* — Marshall, Gerstein & Borun LLP

(57) ABSTRACT

Colloidal quantum wells have discrete energy states and electrons in the quantum wells undergo interband and intersubband state transitions. The transmissivity of a colloidal quantum well may be tuned by actively controlling the states of the colloidal quantum wells enabling ultrafast optical switching. A primary excitation source is configured to provide a primary excitation to promote a colloidal quantum well from a ground state to a first excitation state. A secondary excitation source is configured to provide a secondary excitation to the colloidal quantum well to promote the colloidal quantum well from the first excitation state to the second excitation state with the first and second excitation states being subbands in the conduction band of the colloidal quantum well.

20 Claims, 12 Drawing Sheets

(56) References Cited

U.S. PATENT DOCUMENTS

| | | |
|---|---|---|
| 10,208,245 B2 * | 2/2019 | Goan ................ B82Y 40/00 |
| 2017/0222724 A1 | 8/2017 | Chang et al. |
| 2018/0097518 A1 | 4/2018 | Schaller et al. |

OTHER PUBLICATIONS

Lahnemann et al. "Near- and min-infrared intersubband absorption in top-down GaN/AlN nano- and micro-pillars," IOP Publishing—Nanotechnology, vol. 30, No. 5, Nov. 2018.

Chen et al. "Optimization of barrier layer thickness in MgSe/CdSe quantum wells for intersubband devices in the near infrared region," Journal of Applied Physics, vol. 118, iss. 16, Oct. 2015.

Akimoto et al. "Sub-picosedond electron relaxation of near-infrared intersubband transitions in n-doped (CdS/ZnSe)/BeTe quantum wells," Applied Physics Letters, vol. 81, iss. 16, Aug. 2002.

Heber et al. "Comparative study of ultrafast intersubband electron scattering times at ~1.55um wavelength in GaN/AlGaN heterostructures," Applied Physics Letters, vol. 81, iss. 7, Apr. 2002.

\* cited by examiner

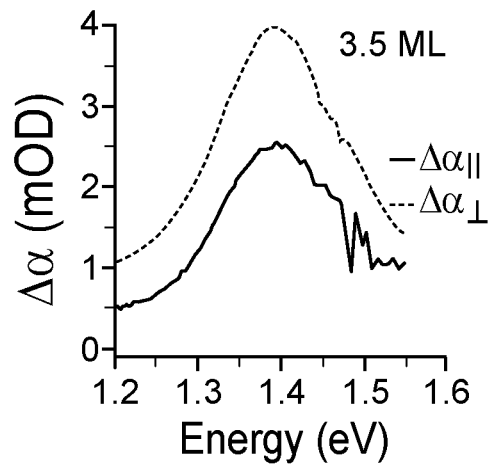 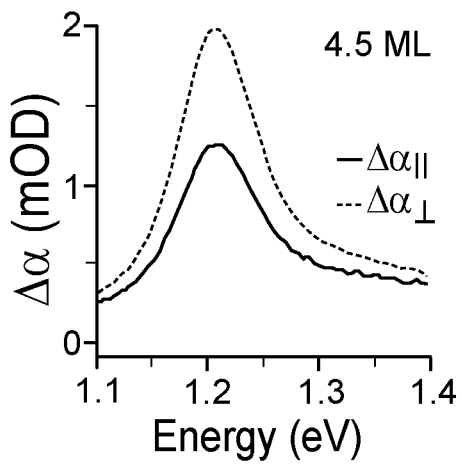
FIG. 8A    FIG. 8B
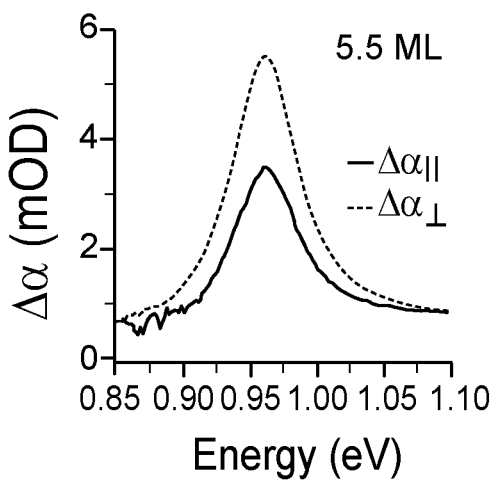 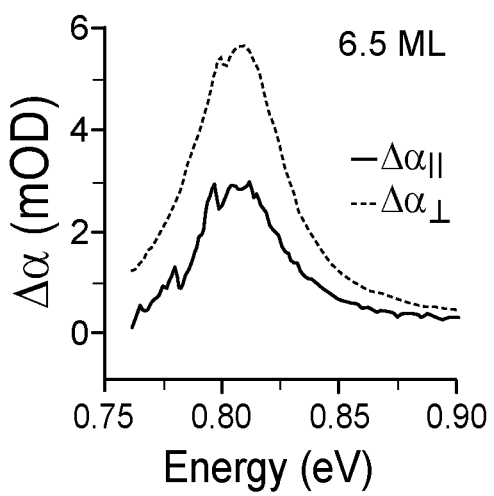
FIG. 8C    FIG. 8D

ULTRAFAST OPTICAL SWITCHES USING QUANTUM WELLS

STATEMENT REGARDING FEDERALLY SPONSORED RESEARCH OR DEVELOPMENT

This invention was made with government support under Contract No. DE-AC02-06CH11357 awarded by the United States Department of Energy to UChicago Argonne, LLC, operator of Argonne National Laboratory. The government has certain rights in the invention.

FIELD OF THE DISCLOSURE

The present disclosure relates to the manipulation of the transmissivity of optical materials and, in particular, materials for use in optical computing and quantum information processing.

BACKGROUND

Modern computer processor units (CPUs) require hundreds of millions of switches or switching elements to perform arithmetic, logic, and other computational functionalities. The most common switches that are employed in CPUs today are electrical transistors, which can be manufactured on the scale of tens of nanometers, allowing for a high density of transistors on a single chip. The miniaturization of transistors has allowed for the fabrication of faster CPUs that are able to process more complex algorithms, although the miniaturization of electrical transistors is approaching its physical limit due to the fact that modern transistors are about 70 atoms wide (for a silicon transistor). Electrical transistor devices with dimensions at the nanometer scale suffer from an increased probability of electron tunneling, increased effects of resistive drops and nonuniform dopants, and increased current leakage through the transistor. Additionally, the switching speed of electrical switches is fundamentally limited by the time-scale of electron motion, resulting in switching speeds typically on the order of nanoseconds.

Optical switches provide an alternative to electrical transistors for use in computational and processing technologies. Currently, modes of optical switching exist for routing and processing of data via optical fibers. Two spectral bands, with wavelengths in the ranges of 1300 nm and 1550 nm, are nearly universal in present optical communications technologies due to spectral scattering and absorption bands in optical fibers. It is therefore beneficial for optical switches to operate in the 1300 and 1550 nm bands, as these are the wavelengths at which most data is already processed for long-range transport.

Switching of optical signals is critical for routing digital information, but generally optical signal-processing steps are essentially static. Static optical switching, also known as passive optical switching (i.e. not changing with time), usually involves multiplexing and demultiplexing materials using Bragg reflectors (narrowband mirrors) or similar photonic structures. Dynamic switching (also known as active switching) of signals is critical to processing optical information in more complex communication systems. Most current optical switching technologies are substantially slower than electrical switching technologies when performing digital logic operations. Therefore, use of optical switching limits the capabilities and bandwidths of optical processing and computing systems. Existing active optical switching technologies vary greatly in the switching mechanism, ranging from mechanical mirror motion to all-optical methods, and frequently are limited to on/off cycles of hundreds of picoseconds. These technologies generally require a microfabricated photonic structure (photonic crystal or similar), which has a large spatial footprint on the order of hundreds of nanometers or larger. Epitaxial fabrication methods are typically employed for fabricating optical switches, which limits the ability to generate narrowband optical devices, and the material makeup of the devices, due to substrate and lattice matching requirements. Additionally, epitaxial devices fabrication provides limited options for device form factors, and can result in low quality factor (Q factor) devices due to doping non-uniformity, lattice tensions, and surface defects among other factors.

SUMMARY OF THE DISCLOSURE

A method for controlling the optical transmissivity of a material including includes applying a primary excitation to a suspension material having a suspended colloidal quantum well structure therein, the colloidal quantum well structure having a ground state, a primary excitation state, and a secondary excitation state, the secondary excitation state being a subband excitation state. Applying the primary radiation excites the colloidal quantum well structure from the ground state to the primary excitation state. The method further including applying a secondary excitation to the suspension material to promote the colloidal quantum well structure from the primary excitation state to the secondary excitation state, wherein the secondary excitation comprises secondary radiation.

An optical device includes a suspension material and a colloidal quantum well structure suspended in the suspension material, the colloidal quantum well structure having a ground state, a primary excitation state, and a secondary excitation state, the secondary excitation state being a subband excitation state. The optical device further includes a primary excitation source configured to provide a primary excitation to the colloidal quantum well structure and a secondary excitation source configured to provide a secondary excitation to the colloidal quantum well structure, the secondary excitation selected to promote the colloidal quantum well structure from the primary excitation state to the secondary excitation state, wherein the secondary excitation comprises secondary radiation.

BRIEF DESCRIPTION OF THE DRAWINGS

FIGS. 8A-8D are plots of data demonstrating the polarization dependence of 3.5, 4.5, 5.5, and 6.5 monolayer cadmium selenide colloidal quantum wells.

DETAILED DESCRIPTION

Figure 1A:
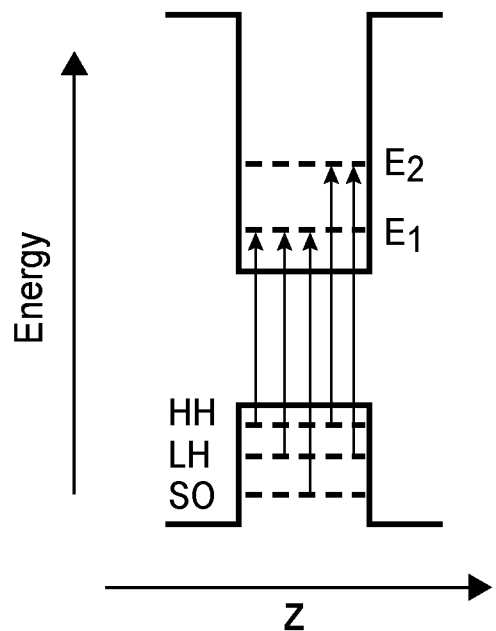
FIG. 1A is a diagram of the energy band structure for an arbitrary quantum well with subband energy states.

Optical modulation or switching at the picosecond time scale provides a means for increasing the bandwidth and processing speeds of optical processing and computational systems. One potential approach for creating an active optical switch is by modulating the transmission of light through a material in real time. Controlling the optical transmissivity of a material can be done by manipulating the excitation state of electrons in quantum wells. For example, electrons in one state may not absorb infrared light, while when excited or in another state, the electrons may readily absorb the desired wavelengths of light. Therefore, controlling the states of electrons in a quantum well may enable the fabrication of active optical switches and modulators.

Potential quantum wells are two-dimensional materials in which one dimension is atomically precise in the number of layers, and as such, quantum wells confine charged particles or carriers to occupy a two-dimensional planar region, rather than three-dimensional space. This spatial restriction is known as quantum confinement. The effects of quantum confinement cause charged carriers in a quantum well to occupy only discrete energy levels of the quantum well called "energy bands" and "energy subbands." The energy bands or energy states are determined by the quantum well material dimensions, electromagnetic properties, and the number of atomic layers. Additionally, the energy bands and subbands determine the radiative wavelengths at which the quantum well is optically active (i.e., optical absorptive and transmissive properties of the quantum well).

Quantum wells are often fabricated in repeating stacks through an epitaxial process. The absorption and photoluminescence properties of a quantum well may be tuned to different wavelengths by fabricating stacks with atomic thicknesses and by controlling the temperature of the quantum well. Efforts to fabricate thinner epitaxial quantum-well structures using wider band gap semiconductor materials have extended the energy range of quantum well absorption to the near infrared (IR), which is particularly useful in telecommunications technologies operating in wavelength ranges of 1.3 μm and 1.55 μm. However, epitaxial quantum wells suffer from broad absorption resonances in the near-IR range due to inhomogeneity of the growth process and strain or defects introduced at material interfaces. Some classes of materials display a quantum well-like electronic structure without the need for epitaxial growth, including van der Waals two-dimensional materials, quasi-two-dimensional perovskites, and colloidal quantum wells. Non-epitaxial, colloidal quantum wells enable the tuning of optical absorption features by controlling the thickness and temperature of the quantum well. Additionally, colloidal quantum wells enable the fabrication of materials and devices with substantially narrower near-IR absorption features and a broader range of form factors than is achievable by epitaxial quantum well based devices. While it is acknowledged that epitaxial quantum wells may be implemented in embodiments for active modulation of optical absorption properties of a material, the present disclosure focuses on non-epitaxial colloidal quantum wells, such as a cadmium selenide (CdSe) quantum well or platelet as discussed further below.

For embodiments herein, the terms "primary excitation state", and "secondary excitation state" may also be used to describe the energy states of a system. The term "primary excitation state" should be understood to be a non-ground state of a system, the transition to which is stimulated by a primary excitation provided by a primary excitation source, as described below. Similarly, the term "secondary excitation state" should be understood to be a non-ground state of a system, the transition to which is stimulated by secondary radiation provided by a secondary radiation source, as also described below.

In electromagnetics, it is common to distinguish between a frequency, wavelength, energy, and color of electromagnetic radiation. Each of these four characteristics is related to the other three. For example, the wavelength, in nanometers (nm), and frequency, in hertz (Hz), for a specified electromagnetic radiation are inversely proportional to each other. Similarly, the energy, in electron-volts (eV) or joules (J), of electromagnetic radiation is proportional to the frequency of that radiation. Therefore, for a given radiation at a given frequency, there is a corresponding wavelength and energy.

The fourth of the aforementioned characteristics, color, typically represents a group or band of frequencies or wavelengths. For example, the color blue is commonly defined as electromagnetic radiation with a wavelength from 450 nm to 495 nm. This wavelength band also corresponds to frequencies from 606 THz to 668 THz, and energies of 2.5 to 2.75 eV. The color blue, then, is any radiation with one of those wavelengths, or radiation with multiple wavelengths in that band. Therefore, the term color may refer to one specific wavelength, or a band of wavelengths. Some areas of trade in electromagnetics prefer the use of one of the four terms over the others (e.g., color and wavelength are preferred when discussing optical filters, whereas frequency and energy are preferred when discussing optical excitation processes). Therefore, the four terms may be understood to be freely interchangeable in the following discussion of electromagnetic radiation, quantum wells, and single-photons.

Additionally, as a person of ordinary skill in the art would understand, the terms excited state, excitation state, quantum state, and energy state can be interchangeable when describing the state of a system. Also, the states of a system may also be described as having or existing with a specific energy, E, associated with the state. Therefore, it should be understood that a state may be referred to as an energy state E, or a state with energy E interchangeably. As such, it should be understood that a label E may refer to the energy of a state and/or to the state itself. In photonics, and specifically when considering single photon emission, the terms emission time, relaxation time, relaxation rate, transmission rate, transition time, decay rate, and decay time are also understood to be interchangeable in most cases. In addition, a person of ordinary skill in the art would recognize that the terms excite, promote, or energize are often interchangeable when discussing the transition of a system from one energy level to another, higher, energy level, and similarly the terms de-excite, rest, and recombine may be used interchangeably when discussing the transition of a system from one energy level to another, lower, energy level. It should also be understood that descriptions of excitations of a colloidal quantum well may be understood to be excitations of a charged carrier (e.g., an electron and/or hole) in the colloidal quantum well, and similarly, states of the colloidal quantum well may be understood to be states of a charged carrier (e.g., an electron and/or hole) in the colloidal quantum well.

Figure 1B:
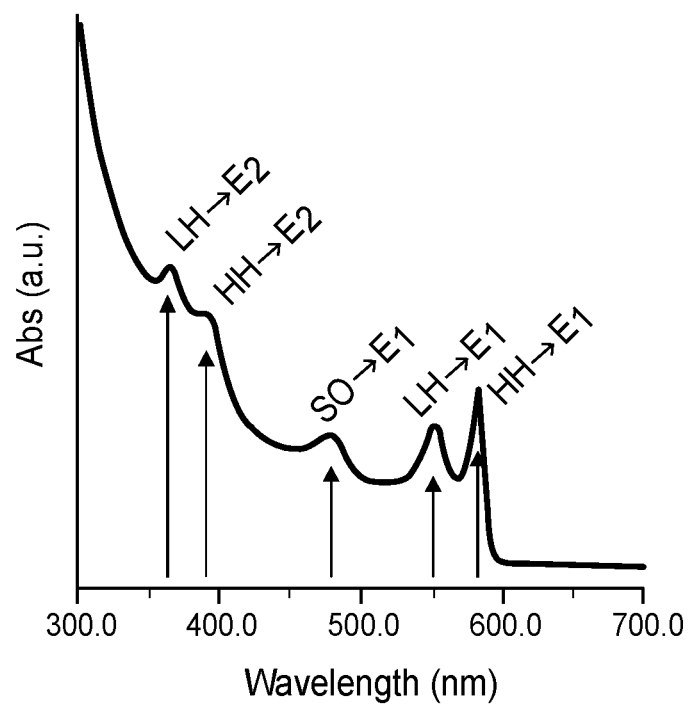
FIG. 1B is a plot of the absorption spectra of an arbitrary quantum well structure with absorption peaks corresponding to different interband energy state transitions.

The efficiency and spectrum of optical absorption and emission of a quantum well depend heavily on the bandgap and subband gap energies of the quantum well. FIGS. 1A and 1B are diagrams illustrating the energy band structure and absorption spectra of an arbitrary quantum well structure. FIG. 1A is a typical representation of energy bands for quantum dots, electrons in quantum wells, or any other particle or ensemble able to occupy various energy bands. The absorption spectra in FIG. 1B display various absorption peaks that correspond to various possible transitions between the energy bands illustrated in FIG. 1A. Effective mass modeling of a quantum well structure results in the splitting of the valence band into three separate bands, the heavy-hole (HH), light-hole (LH), and spin-orbit (SO) bands, as shown in FIG. 1A. The conduction band is split into multiple subbands with a primary conduction subband ($E_1$), and a secondary conduction subband ($E_2$). Each of the possible transitions illustrated in FIG. 1A has a corresponding absorption peak in the spectrum of FIG. 1B. The HH to S1 transition (arrow on the far left) has the smallest energy difference of all of the transitions illustrated in FIG. 1A, and therefore corresponds to the absorption peak with the longest wavelength (i.e., the lowest energy) in FIG. 1B. The energy difference of the transitions increases, from left to right, across the transitions illustrated by the arrows in FIG. 1A, corresponding to absorption peaks with decreasing wavelengths illustrated by the arrows in the absorption spectrum of FIG. 1B.

Figure 2A:
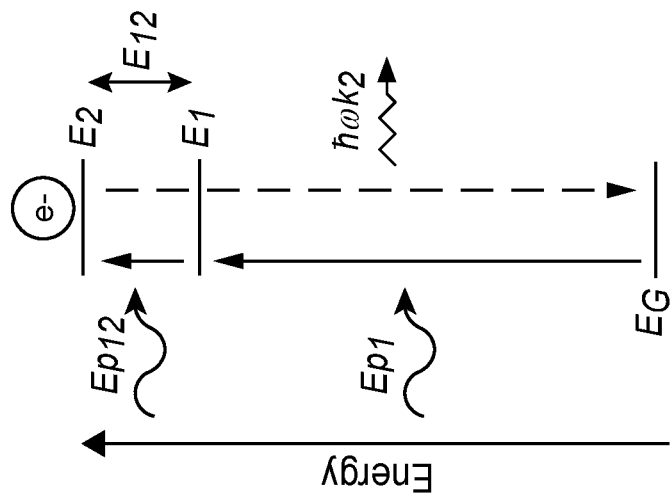
FIG. 2A is a diagram illustrating an electron at ground state in a three-state quantum well system.
Figure 2B:
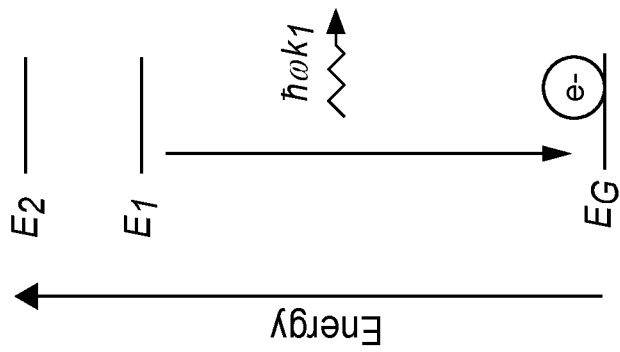
FIG. 2B is a diagram illustrating radiation exciting an electron from the ground state to a first excited state in a three-state quantum well system.
Figure 2C:
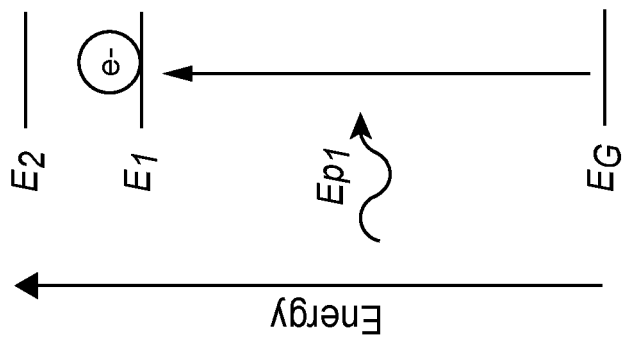
FIG. 2C is a diagram illustrating emission of a phonon and relaxation of an electron from a first excited state to the ground state in a three-state quantum well system.
Figure 2D:
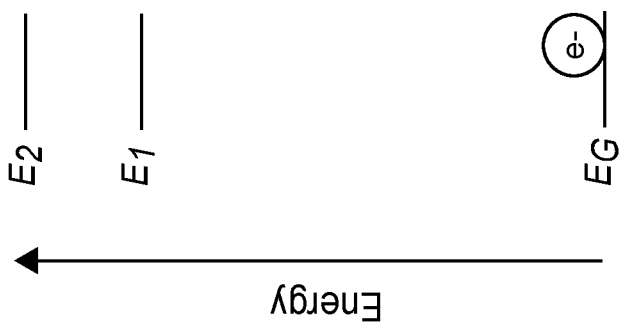
FIG. 2D is a diagram illustrating primary radiation exciting an electron from a ground state to a first excited state, secondary radiation exciting the electron from the first excited state into a second excited state, and the subsequent emission of a phonon and relaxation of the electron from the second excited state to the ground state in a three-state quantum well system.

Once an electron or particle is excited to the $E_1$ subband, the particle may transition from the $E_1$ subband to another subband in the conduction band, such as the subband $E_2$, known as an intersubband transition. FIGS. 2A-2D further illustrate this principle. FIGS. 2A-2D show an electron in a quantum well, e−, and three energy states: a ground energy state, $E_G$, a primary excited energy state, $E_1$, and a secondary excited energy state, $E_2$. The ground state $E_G$ may be any of the valence band states illustrated in FIG. 1A (i.e., the HH, LH, or SO bands). In FIGS. 2A-2D, the primary excited energy state is the lowest excited state or first excited energy state with energy $E_1$, and the secondary excited energy state is a second excited energy state with an energy $E_2$, greater than $E_1$, both $E_1$ and $E_2$ being subbands of the conduction band. As illustrated in FIG. 2A, at room temperature, the electron typically exists in or occupies the ground energy state. The electron remains in the ground energy state until some form of excitation or perturbation changes the state of the electron in the quantum well. FIG. 2B illustrates an excitation energy provided by a photon with energy $E_{p1}$. The photon provides energy to the electron exciting it to the first excited state. For colloidal quantum wells, such as for a CdSe platelet, the excitation energy $E_1$ is in the visible range, and the energy gap between the ground state and the first excited state may be determined by the number of CdSe layers in the platelet, discussed further below. Once in the first excited state, the electron may couple to a vibrational mode, de-excite or relax back down into the ground state, and emit a phonon with energy $\hbar\omega_{k1}$ as illustrated in FIG. 2C. Alternatively, as illustrated in FIG. 2D, instead of relaxing back into the ground state from the first excited energy state, a second further perturbation with energy $E_{12}$ may excite the electron from the first excited energy state into the second excited energy state. In the illustration of FIG. 2D, and the embodiments herein, electromagnetic radiation is absorbed by the electron in the quantum well causing the transition from the first excited energy state to the second excited energy state, also referred to herein as an intersubband transition or intersubband absorption. Once in the second excited energy state, the electron may relax back into the ground energy state emitting a phonon with energy $\hbar\omega_{k2}$.

While the de-excitations in FIGS. 2C and 2D are illustrated as de-excitations through the emission of phonons, de-excitations may also occur due to other non-radiative processes such as through Auger scattering, transitions to intermediate trap states, and coupling to vibrational modes of the quantum well, or vibrational modes of ligands attached to the quantum well structure. Additionally, the de-excitations may be radiative in nature, emitting a photon with an energy $E_1$, or $E_2$, each of which has an energy greater than the energy $E_{p12}$.

Figure 3A:
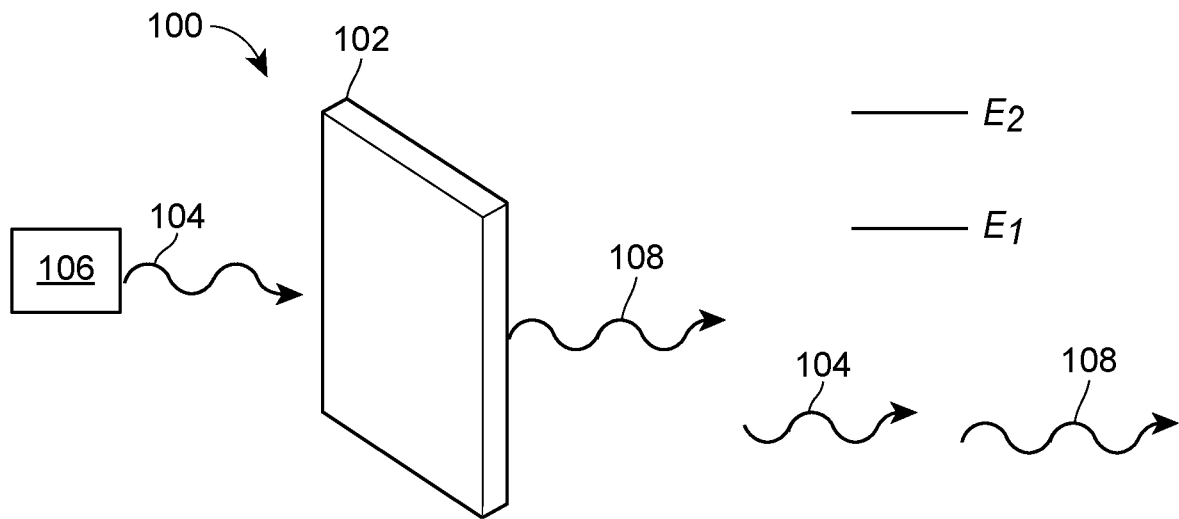
FIG. 3A illustrates an embodiment of an optical switching system with a colloidal quantum well transparent to near infrared radiation.
Figure 3B:
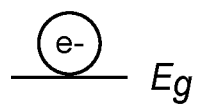
FIG. 3B is a diagram of the colloidal quantum well in the optical switching system illustrated in FIG. 3A having a ground state, a first excited state with an energy, and a second excited state with an energy.
Figure 3C:
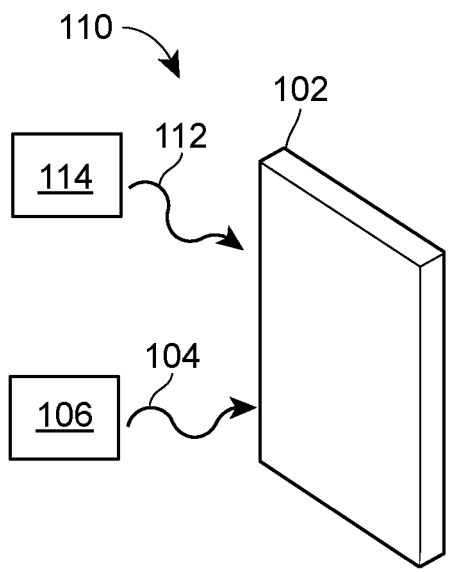
FIG. 3C illustrates an embodiment of an optical switching system with a colloidal quantum well opaque to near infrared radiation.

FIGS. 3A through 3D illustrate an embodiment of an optical switching system with a colloidal quantum well 102 having a ground state, $E_g$, a first excited state with an energy $E_1$ in the visible range, a second excited state with an energy $E_2$ greater than $E_1$, and an subband energy gap $E_{12}$ between the first and second excited states, in the IR range. FIG. 3A illustrates a near-IR optical switch 100 in transparent mode, while FIG. 3C illustrates a near-IR optical switch 110 in absorptive or opaque mode. Referring now simultaneously to FIGS. 3A and 3B, electrons in the colloidal quantum well 102 exist in the ground state $E_g$ and near-IR radiation 104 from an IR excitation source 106 is incident on the colloidal quantum well 102. In such an embodiment, the electron in the ground state does not absorb the incident near-IR radiation 104, because the transition from the ground level to the first or second excited states requires an excitation with energies greater than the energies provided by the incident IR radiation 102. Therefore, the colloidal quantum well 102 of FIG. 3A, with electrons in the ground state, is transmissive to the incident near-IR radiation 104, resulting in transmitted near-IR radiation 108.

Figure 3D:
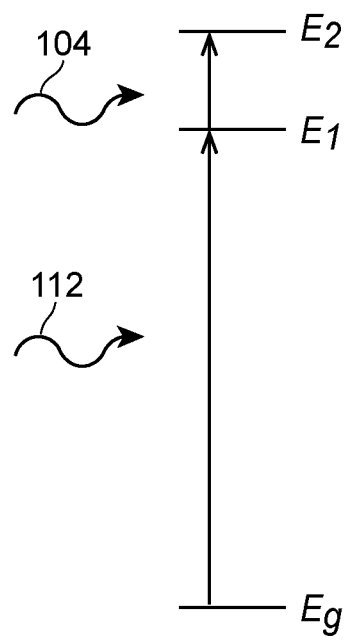
FIG. 3D is a diagram of the colloidal quantum well in the optical switching system illustrated in FIG. 3C having a ground state, a first excited state with an energy, and a second excited state with an energy.

In the embodiment of the opaque optical switch 110 of FIG. 3C, the colloidal quantum well 102 with incident visible radiation 112 and incident near-IR radiation 104. As illustrated in FIG. 3D, a primary excitation source 114 provides the visible radiation 112 that promotes an electron from the ground state to the first excited state. The near-IR radiation 104 is then absorbed by the electron causing the electron to undergo the intersubband transition from the first to the second excited states, rendering the colloidal quantum well 102 in FIG. 3C as opaque to near-IR radiation. FIGS. 3A-3D illustrate the ability to apply a primary radiation to a colloidal quantum well to control the population of electrons in a first excitation state, and further, photoinducing an intersubband transition for active optical switching and modulation of near-IR radiation optical signals.

The IR excitation source 106 may be a laser, a light emitting diode, a single-photon source, a black-body radiation source, an IR radiation source, or any other source or combination of sources able to provide the desired near-IR radiation to the colloidal quantum well 102. Similarly, the primary excitation source 114 may be a laser, a light emitting diode, a single-photon source, a black-body radiation source, a visible radiation source, or any other source or combination of sources able to provide the desired radiation to the colloidal quantum well 102. The visible radiation 112 and near-IR radiation 104 may also each be continuous radiation, pulsed radiation with a constant duty cycle, pulsed radiation with a duty cycle that increases or decreases over time, pulsed radiation with a pulse repetition frequency that increases or decreases over time, pulse radiation with a radiation frequency that increases or decreases over time, pulsed radiation with an arbitrary pulse pattern, pulsed radiation with a predetermined pulse pattern, pulsed radiation with a probabilistic pulse pattern or sequence, or any other pulsed radiation pattern.

In embodiments, the primary excitation for populating the first excited state of a quantum well may not be a photoexcitation due to a primary radiation, but may instead be an electrical excitation. An electrical excitation may be provided by a voltage source or power source in electrical communication with the colloidal quantum well (e.g., a colloidal quantum well dispersed in an electrolytic solution). In other embodiments, the primary excitation may be an electrochemical excitation. Colloidal quantum wells may be suspended or dispersed in a solution and a chemical reaction may be initiated in the solution (e.g., by introducing a reagent into the solution) and excess free energy from the chemical reaction may act as the primary excitation for the electrons in the quantum wells. In embodiments that employ quasi-static excitations, such as electrochemical excitations, Zeeman and Stark effects may result in the splitting of the conduction band into subbands, providing a means for controlling the existence of the second excited state or subbands of the colloidal quantum wells.

In embodiments previously described, the colloidal quantum well is characterized as having only three quantum states: a ground state, a primary excited state, and a secondary excited state. In many embodiments described herein, the primary excited state is a first excited energy state with energy $E_1$, and the secondary excited state is a second excited energy state with energy $E_2$ that is greater than $E_1$, with $E_1$ and $E_2$ being subbands. In other embodiments, the colloidal quantum well may have three, four, five, or more quantum states including but not limited to orbital angular momentum states, spin states, fine structure states, Zeeman split states, Stark shifted states, Stark split states, degenerate states, or any other quantum state or energy state. In embodiments with only two excited energy states, it is to be understood that the term first excited state refers to the lower of the two excited energy states. In embodiments with more than two excited states it should be understood that the numerical labeling (i.e., first, second, third, etc.) denotes the relative energy levels of the excited states from the first excited state having a lowest excited energy level, to the second excited state having the next lowest excited energy level, to the third excited state having the third lowest excited energy level, and so on sequentially for each subsequent energy level. In any embodiment, the primary excited energy state may be any of the excited energy states of the system, and the secondary excited energy state may be any other of the excited energy states of the system. In addition, in embodiments that enable polarization dependent switching or modulation, the secondary radiation polarization may be horizontal, vertical, diagonal, linear, right- or left-circular, elliptical, or any other polarization.

Figure 4A:
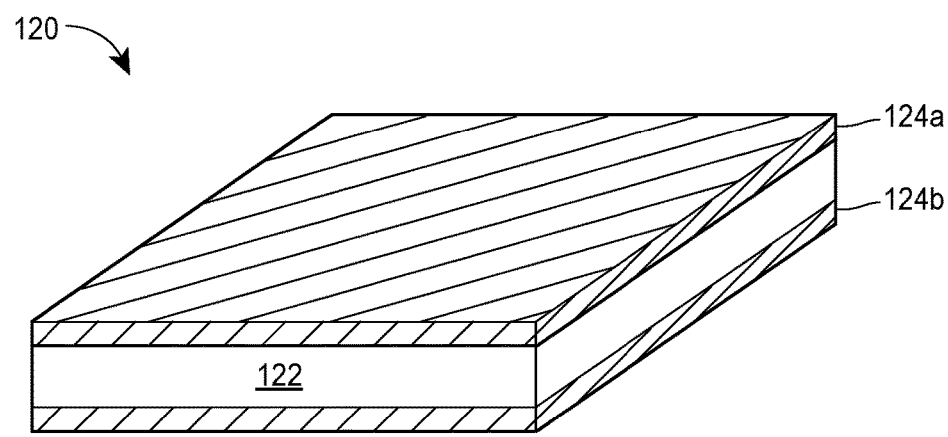
FIG. 4A illustrates an embodiment of a colloidal quantum well as a nanoplatelet with a quantum well layer with a single monolayer sandwiched between a first and second ligand layer.
Figure 4B:
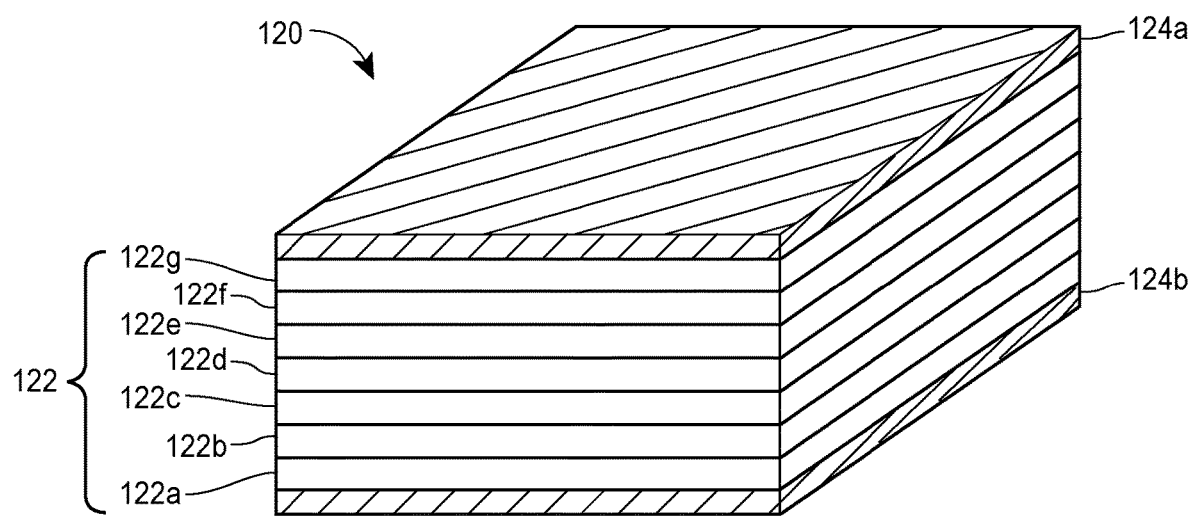
FIG. 4B illustrates an embodiment of a colloidal quantum well as a nanoplatelet with a quantum well layer with multiple monolayers of materials sandwiched between two ligand layers.

FIG. 4A illustrates an embodiment of a colloidal quantum well 120 as a nanoplatelet with a single monolayer 122 sandwiched between a first and second ligand layer 124a and 124b. The colloidal quantum well 120 may be synthesized in solutions by known colloid fabrication methods. The first and second ligand layers 124a and 124b assist with stabilizing the structure of the quantum well layer 122. In embodiments, the quantum well layer 122 may be a single monolayer of material, or multiple monolayers of materials depending on an optically active wavelength of interest. The thickness, or number of monolayers, of the colloidal quantum well 120 determines the electronic structure of the energy bands, including both the interband energy gaps and the intersubband energy gaps. Therefore, the absorption spectrum of the colloidal quantum well 120 may be engineered during fabrication by controlling the number of monolayers in the quantum well layer 122. FIG. 4B illustrates an embodiment of a colloidal quantum well 120 with a quantum well layer 122 with multiple monolayers 122a-122g of materials sandwiched between two ligand layers 124a and 124b. In embodiments, the multiple monolayers 122a-122g may be the same material or different materials as discussed in further detail in reference to FIG. 9A. In embodiments, the monolayers may be CdSe, zinc selenide, mercury selenide, lead sulfide, lead selenide, cadmium sulfide, cadmium telluride, indium arsenide, indium phosphide or any combination thereof. While illustrated as seven monolayers in FIG. 4B, the colloidal quantum well 120 may have any number of monolayers. The number of monolayers of a colloidal quantum well may depend on a desired optically active wavelength band. While the embodiments disclosed herein focus on colloidal quantum well structures, similar quantum well materials may be fabricated by non-epitaxial and non-colloidal methods, such as by vapor-liquid-solid growth, which results in quantum belt morphologies.

Figure 5:
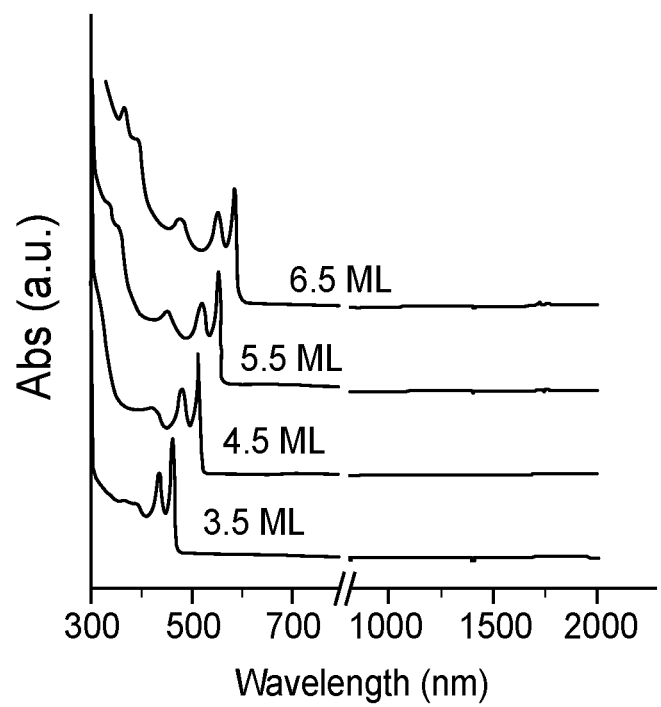
FIG. 5 is a plot of the steady-state optical absorption spectra for cadmium selenide colloidal quantum wells with varied numbers of monolayers.

FIG. 5 is a plot of steady-state optical absorption spectra for CdSe colloidal quantum wells with varied thicknesses, or numbers of monolayers. FIG. 5 displays the absorption spectra for colloidal quantum wells with 3.5 to 6.5 monolayers of CdSe, in the ground (unexcited) state. As a person of ordinary skill in the art would recognize, many colloidal quantum well structures have an extra half layer of one of the materials of the colloidal quantum well. For example, a 3.5 monolayer CdSe quantum well has three CdSe layers and one added layer of either cadmium or selenide. Additionally, as a person of ordinary skill in the art would recognize, it is common to omit the 0.5 when referring to the number of monolayers, for example, a 3.5 monolayer structure is often referred to as a 3 monolayer structure in literature. The spectra of FIG. 5 show that the unexcited CdSe colloidal quantum wells exhibit no observable absorption in the IR range, and more specifically, no observable absorption in the near-IR range (700 nm to 2 μm). Absorption peaks are observable between 400 nm and 600 nm with the peak absorption wavelength increasing across the spectra as the number of monolayers in the colloidal quantum well is increased. Multiple absorption peaks exist for each absorption spectrum, which are due to the HH, LH, and SO interband transitions to the first excited state, as previously described in reference to FIGS. 1A and 1B.

Figure 6:
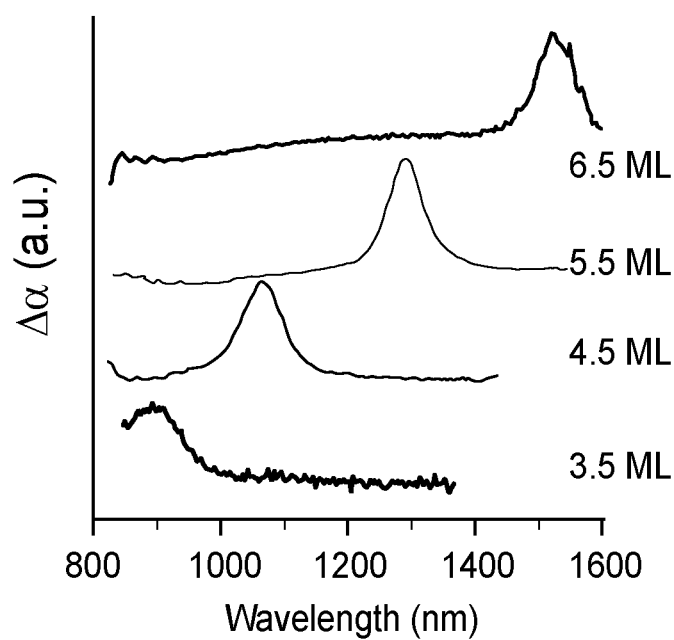
FIG. 6 is a plot of absorption spectra for cadmium selenide colloidal quantum wells with varied numbers of monolayers, having electrons excited into the first excitation state.

The electronic structure of the intersubbands, and therefore near-IR band absorptions, also depends on the thickness, or number of monolayers, of a quantum well. As previously described, an electron in the first excited state may absorb near-IR photons, or radiation, enabling the modulation of near-IR optical signals. FIG. 6 is a plot of absorption spectra for CdSe colloidal quantum wells with varied thickness or numbers of monolayers, having electrons excited into the first excitation state. Unlike the spectra of FIG. 5, the spectra of FIG. 6 show spectrally narrow absorption features in the near-IR region. The spectra of both FIG. 5 and FIG. 6 show that the absorption features in both the visible and near-IR regions red shift for thicker colloidal quantum wells. Particularly noteworthy are the induced absorption features at the 1.3 μm (5.5 monolayers) and 1.5 μm (6.5 monolayers) bands which are used in telecommunications technologies.

Figure 7A:
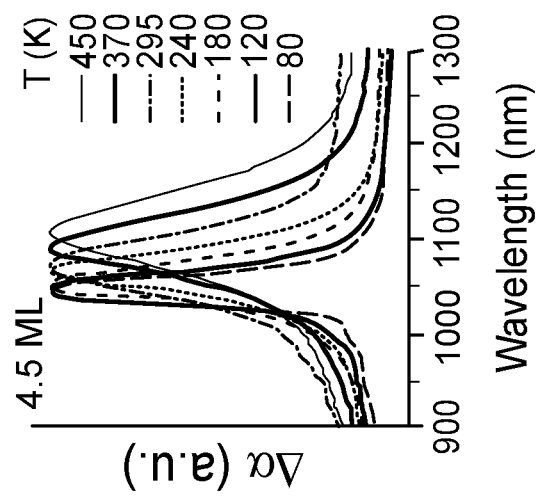
FIGS. 7A-7C are plots showing the temperature-tuning of photoinduced near-infrared absorption spectra for 4.5, 5.5, and 6.5 monolayer cadmium selenide colloidal quantum wells.
Figure 7B:
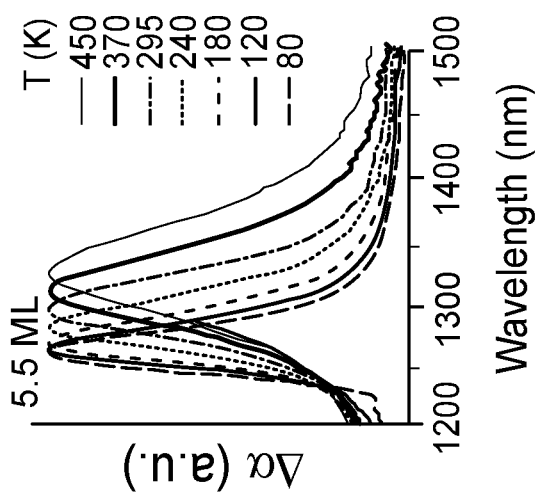
Figure 7C:
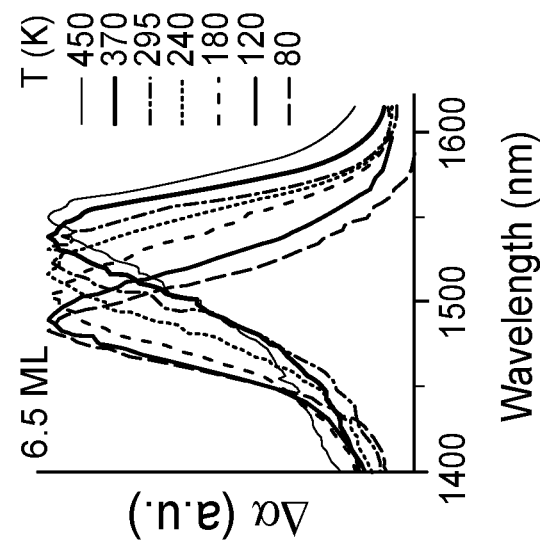

The intersubband absorption wavelength of a colloidal quantum well may also be tuned by controlling the temperature of the colloidal quantum well. FIGS. 7A-7C are plots showing temperature-tuning of photoinduced near-IR absorption features for CdSe colloidal quantum wells. FIGS. 7A-7C demonstrate that the near-IR intersubband red-shifts at higher temperatures. The bandwidths of the near-IR absorption features in FIGS. 7A-7C are on the order of tens of electron-volts. For example, in FIG. 7C, the near-IR absorption feature has a full-width at half-maximum bandwidth of 70 meV and 34 meV (i.e., ≈140 and 70 nm) at 450 K and 80 K, respectively. By comparison, intersubband absorption features in GaN/AlN epitaxial quantum wells, which are active in the 1550-nm wavelength band, show full-width at half-maximum bandwidths of 160 meV (i.e., ≈310 nm) or greater. The narrow bandwidths displayed in FIGS. 7A-7C demonstrate the ability of colloidal quantum wells to modulate signals in the 1300 nm or 1550 nm bands independently which is useful for fabricating wavelength selective optical switches and modulators.

In embodiments, the intersubband transition from the first excited state to the second excited state may be dependent on the polarization of the secondary radiation. For example, the inter-subband transition from the first to the second excited state may only occur when excited by horizontally polarized secondary radiation. In such embodiments, the transition from the first to the second excited state only absorbs horizontally polarized radiation and the population of the first excited state may be dynamically controlled to actively switch or filter the absorption of horizontally polarized light. In embodiments, colloidal quantum wells may have inter-subband transitions that selectively absorb horizontally polarized radiation, vertically polarized radiation, diagonally polarized radiation, circularly polarized radiation, and/or elliptically polarized radiation. FIGS. 8A-8D are plots of data demonstrating the polarization dependent nature of CdSe colloidal quantum wells with varied numbers of monolayers. The data in FIGS. 8A-8D shows the strength of the near-IR band absorption of secondary radiation that is polarized either parallel (solid line) and perpendicular (dotted line) to the primary excitation radiation. The polarization dependent absorption of the colloidal quantum well is dependent upon the electronic structure of the colloidal quantum well and the orientation of the colloidal quantum well in reference to the excitation radiation. The polarization dependent absorption illustrated by FIGS. 8A-8D is for a colloidal quantum well solution with quantum platelets at random spatial orientations. The extinction ratio between the polarization absorptions could be improved by aligning all of the flat surfaces or planes of the platelets to a parallel plane (i.e., aligning a normal vector of the platelets). In embodiments, an electric field may be applied to the colloidal quantum wells to align them to a desired axis, dependent on a primary or secondary excitation radiation, to control the polarization dependent absorption of the colloidal quantum wells. In other embodiments, a Langmuir-Blodget technique may be implemented to align the colloidal quantum wells, or the colloidal quantum wells may be embedded in a polymer and aligned through stretching of the polymer causing shear alignment of the colloidal quantum wells to control the polarization dependent absorption of the colloidal quantum wells.

In embodiments, a primary and/or secondary excitation source may be configured to provide primary and/or secondary excitation radiation that is incident on a colloidal quantum well normal to a flat planar side of a colloidal quantum well, such as on either of the first and second ligand layers 124a and 124b of FIG. 4A or 4B. In other embodiments, a primary and/or secondary excitation source may be configured to provide primary and/or secondary excitation radiation that is incident on a colloidal quantum well on a side surface such as on any of the layers 122a through 122g, without passing through a flat planar surface or layer such as the ligand layers 124a and 124b of FIG. 4B. The angle of a radiation source or colloidal quantum well may be tuned or control by an electric field, Langmuir-Blodget techniques, or stretching as previously mentioned, to adjust the polarization dependent absorption of a colloidal quantum well.

Figure 9A:
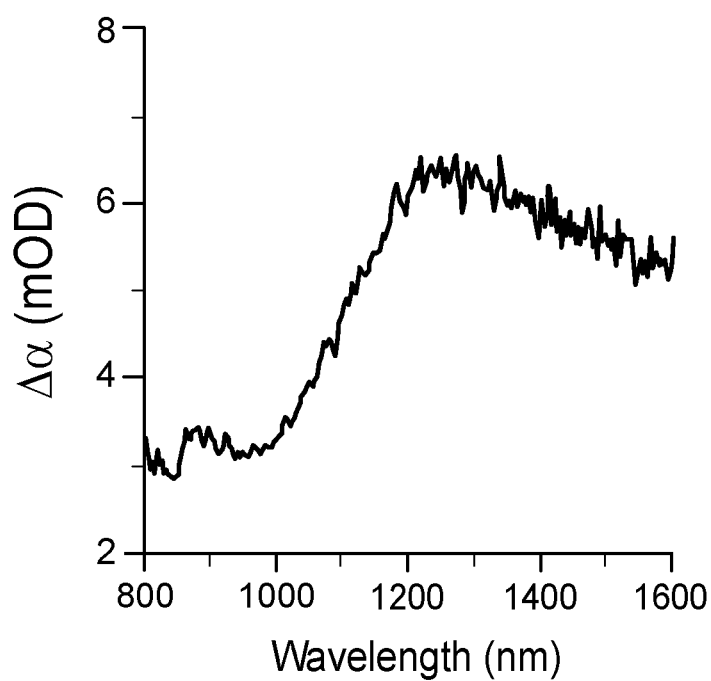
FIG. 9A is a plot of the absorption spectrum for a ten-monolayer core-shell structure colloidal quantum well.
Figure 9B:
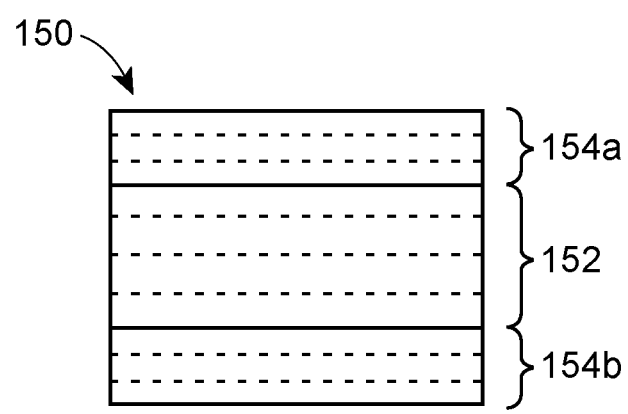
FIG. 9B illustrates an embodiment of a ten-monolayer core-shell structure colloidal quantum well.

In embodiments that employ multiple monolayers of materials in the quantum well layer, the monolayers may be different materials. Different materials in the monolayer stack may broaden the optically active bandwidth of the quantum well. FIG. 9A is a plot of the absorption spectrum for a core-shell structure colloidal quantum well 150, illustrated in FIG. 9B. The core-shell structure colloidal quantum well 150 of FIG. 9B has a core with four monolayers 152 of CdSe sandwiched between the shell made of two stacks 154a and 154b of zinc sulfide (ZnS), each stack of ZnS having three monolayers each. FIG. 9A shows that the bandwidth of the induced near-IR absorption feature is broadened when compared to single material multi-monolayer CdSe quantum wells, from less than 150 nm to greater than 200 nm.

Figure 10:
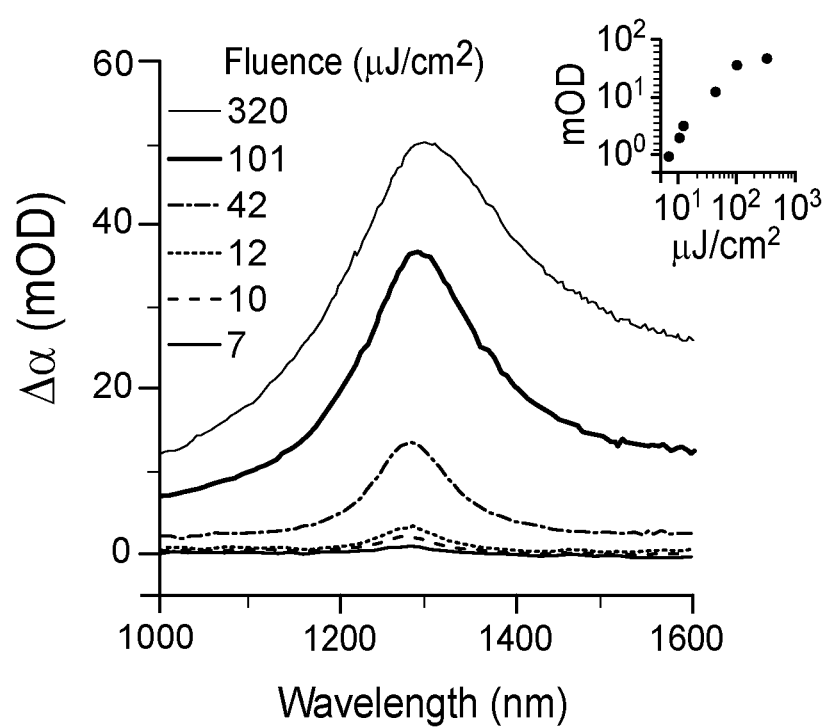
FIG. 10 is a plot of the absorption spectra of a 5.5 monolayer cadmium selenide colloidal quantum well under several different primary radiation fluences.

The energy states of quantum wells have energy values determined by intrinsic properties such as the atomic structure of the quantum well, the crystal lattice, and the number of monolayers (discussed further below). Excited quantum states also have characteristic decay or relaxation times. The length of the decay time of a given quantum state depends on the density of states and the temperature of the material among other factors. The intersubband absorptions of colloidal quantum wells exhibit Auger recombination and hot carrier effects depending on the fluence (i.e., the delivered optical energy per unit area) of the primary excitation. FIG. 10 is a plot of the absorption spectra of a 5.5 monolayer CdSe colloidal quantum well under several different primary radiation fluences. FIG. 10 shows that higher primary radiation fluences increase the strength of the intersubband absorption, up to a limit under which saturation of the primary excited state occurs.

Figure 11:
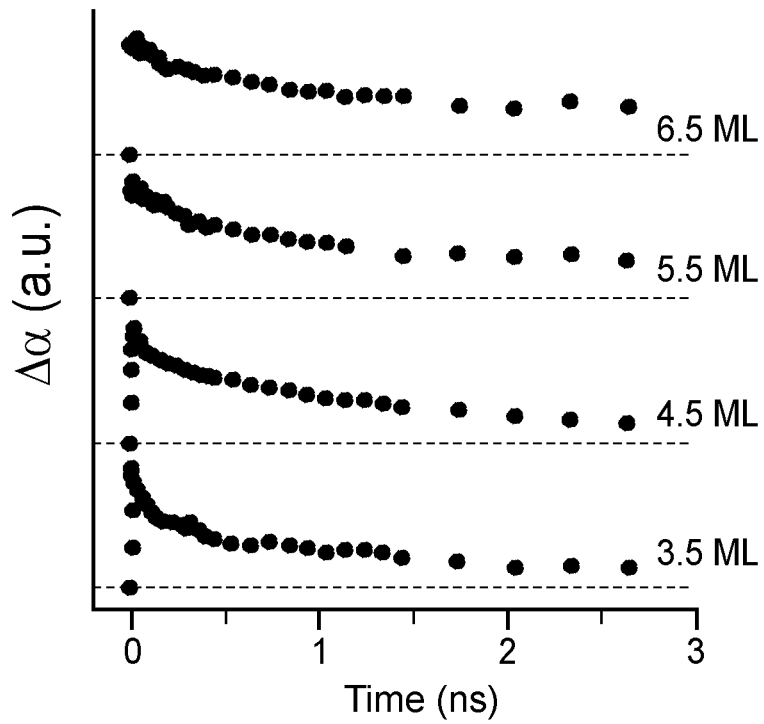
FIG. 11 is a plot of the time-resolved photoinduced near infrared absorption feature of cadmium selenide quantum wells with thicknesses of 3.5, 4.5, 5.5, and 6.5 monolayers.

In current embodiments, optical excitations of a carrier in a colloidal quantum well induce near-IR absorption features enabling the quantum well to perform as an add/drop filter, switch, or optical modulator. FIG. 11 is a plot of the time-resolved photoinduced near-IR absorption feature of CdSe quantum wells with thicknesses of 3.5, 4.5, 5.5, and 6.5 monolayers. FIG. 11 shows that the switch-on time for the CdSe colloidal quantum wells is on the order of picoseconds while the switch-off time is on the order of nanoseconds, and further, that the switch-off time increases with quantum well thickness. The longer switch-off times are due to electron-hole recombination lifetimes that take longer than the initial electron excitation. In embodiments, the colloidal quantum wells may be doped with electron and hole accepting molecules that alter the recombination lifetimes of carriers in the quantum wells to generate optical switches with turn-off times ranging from picoseconds to microseconds long.

Figure 12:
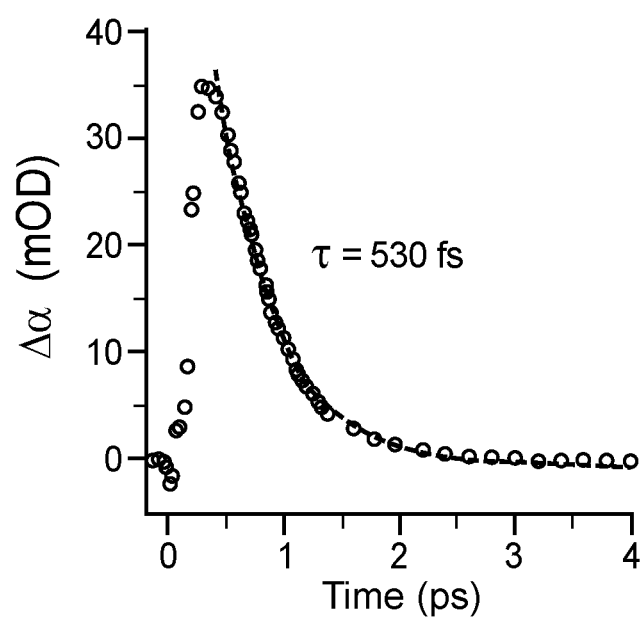
FIG. 12 is a plot of the time-resolved photoinduced absorption feature lifetime for 5.5 monolayer cadmium selenide quantum wells with a primary excitation and a switch-off control excitation.

In embodiments, multiple primary excitations may be provided to a colloidal quantum well to reduce the recombination lifetime and generate switches with switch-off times that are less than a picosecond in length. A primary excitation may excite a sample containing colloidal quantum wells and induce an intersubband absorption feature. A switch-off control excitation, which may be IR radiation, may then be applied to the sample at a delay (to allow for cooling of the charged carriers) which reduces the lifetime of the near-IR absorption feature's lifetime. FIG. 12 is a plot of the time-resolved photoinduced absorption feature lifetime for 5.5 monolayer CdSe quantum wells with a primary excitation and a switch-off control excitation. The primary excitation is 400 nm radiation, and the switch-off control is a 30-fs pulse with a wavelength of 1260 nm. The lifetime of the induced absorption feature in FIG. 12 is 530 fs, orders of magnitude faster than other nanosecond time-scale quantum well technologies.

Figure 13:
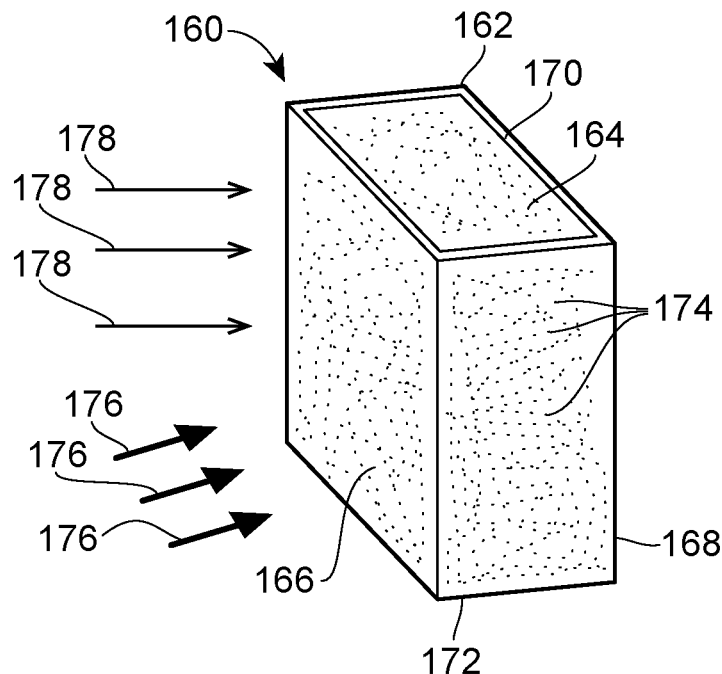
FIG. 13 illustrates an embodiment of an optical cell that may act as an optical switch or optical modulator.

Colloidal quantum wells can be fabricated in solutions allowing for large volumes of colloidal quantum wells to be fabricated simultaneously. Additionally, colloidal quantum wells can be suspended in a solution, embedded or dispersed in a polymer, glass, organic material, organic solvent, or other material. Additionally, colloidal quantum wells may be spin coated or sprayed onto arbitrarily shaped objects. Without the need for crystal matching, as is required for epitaxial quantum wells, colloidal quantum wells can be used to fabricate optical switches with many different types of form factors. FIG. 13 illustrates an embodiment of an optical cell 160 that may act as an optical switch or modulator according to the methods described herein. The optical cell 160 has a chamber 162 (e.g., a cuvette) that contains a solution 164. The chamber 162 has a front surface 166, a back surface 168, a top surface 170 and a bottom surface 172 which join together to create a cavity of the chamber 162 containing the solution 164. Colloidal quantum wells 174 are dispersed throughout, and suspended in, the solution 164 contained in the chamber 162. A primary radiation 176 and a secondary radiation 178 may be applied to the optical cell 160, incident on the front surface 164, and transmitted to the solution 164 to operate the optical cell 160 as a switch, according to the methods described herein. The presence of the primary radiation 176 may render the optical cell 160 opaque to the secondary radiation 178, and conversely, the optical cell 162 may be transmissive of the secondary radiation 178 in the absence of the primary radiation 176.

In embodiments, a chemical process may excite the colloidal quantum wells 174 electrochemically. In embodiments, the top surface 170 may have an aperture, or the top surface 170 may be removable, to introduce a reactant into the solution 164 contained in the chamber 162. In other embodiments, the top and bottom surfaces 170 and 172 of the optical cell 160 may be electrically conductive surfaces providing an electrical connection to the solution 164 and providing a means for electrical communication with the solution 164. In other embodiments, electrical leads or wires may be disposed in the solution 164 to provide electrical communication with the solution. A voltage may be applied to the conductive top and bottom surfaces 170 and 172 (or electrical leads) to provide a voltage across the solution 164 and to electrically excite the colloidal quantum wells 174 in the solution 164. In embodiments, the back surface 168 may be a reflective surface and the optical cell 160 may be an actively controlled mirror that selectively reflects or absorbs the secondary radiation 178. The optical cell 160 of FIG. 13 is one implementation of an optical device that may be convenient for freespace optical systems.

Figure 14:
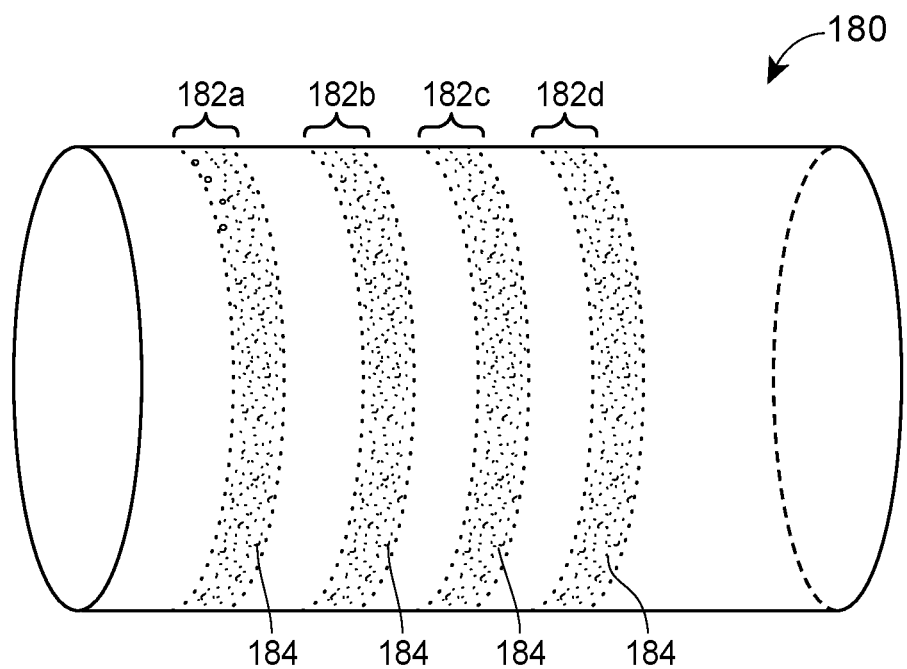
FIG. 14 illustrates an embodiment of a selectively reflective optical fiber segment that has regions with suspended colloidal quantum wells.

In embodiments, the quantum wells may be suspended in silica, or glass in a waveguide, such as in an optical fiber. FIG. 14 illustrates an optical fiber segment 180 that has regions 182a, 182b, 182c, and 182d along the length of the fiber segment 180, with suspended colloidal quantum wells 184. The optical fiber segment 180 may be implemented as an actively controllable Bragg mirror that reflects light when a first excitation is present. The wavelengths of the reflected light may depend on the spacing of the quantum well regions 182a-182d. Additionally, the spacing of the quantum well regions 182a-182d may be chirped to enable a broader band of reflected light in the optical fiber segment 180. The Bragg mirror configuration of FIG. 14 may be implemented in systems to act as a spectral filter, add/drop filter, multiplexer, demultiplexer, and/or a polarizer (in embodiments with polarization dependent excitation states) among other optical devices. The optical fiber segment 180 is one embodiment of employing colloidal quantum wells 184 in a waveguide. Other embodiments may implement other waveguide materials such as plastics, liquids, nonlinear optical materials, and semiconductor materials among others. Additionally, waveguides allow for the possibility of multiple passes for radiation propagation providing higher on-off extinction ratios for optical switches and optical modulators. The fiber based optical device in the embodiment illustrated in FIG. 14 may be implemented in fiber communication systems and devices. Colloidal quantum wells may be applied to any arbitrary surface or shape. For example, colloidal quantum wells may be suspended in an aerosol, paint, or lacquer and applied to any surface or volume.

Figure 15A:
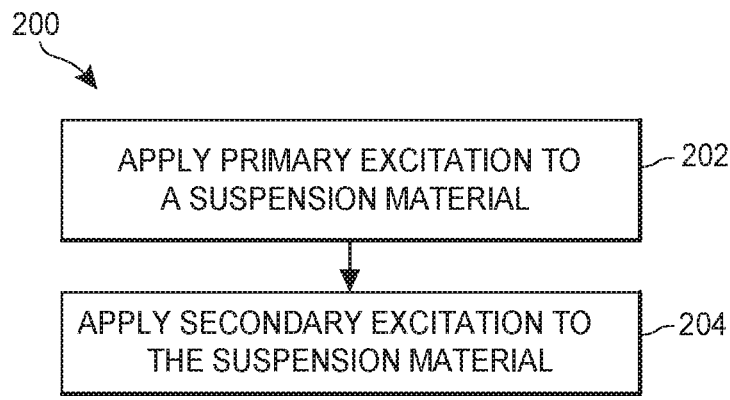
FIG. 15A is a flow diagram of a method for causing a colloidal quantum well in a suspension material to be absorptive or opaque to a secondary excitation or radiation.
Figure 15B:
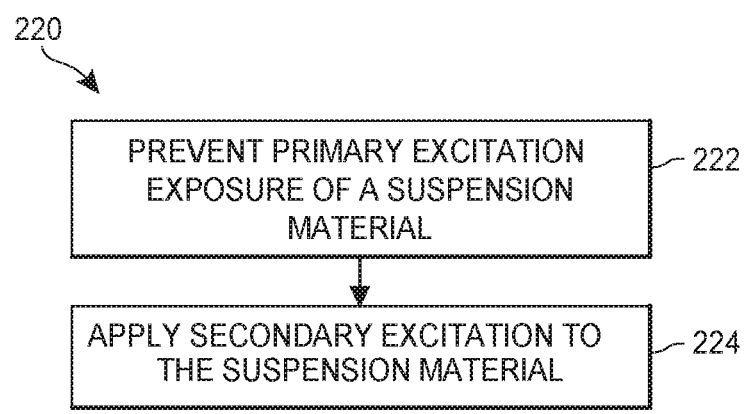
FIG. 15B is a flow diagram of a method for causing a colloidal quantum well in a suspension material to be transmissive to a secondary excitation or radiation.

FIGS. 15A and 15B are flow charts of example methods for actively controlling the optical transmissivity of a colloidal quantum well. The method 200 of FIG. 15A is a method for causing a colloidal quantum well to be absorptive or opaque to a secondary excitation or radiation. The method 200 includes applying a primary excitation to a suspension material (block 202). The suspension material contains a colloidal quantum well structure with a ground state, a first excited state, and a second excited state. The primary excitation excited the colloidal quantum well structure into the first excited state. The quantum well structure may be chosen to be a single monolayer, a plurality of monolayers, a single material, a plurality of materials, a core-shell structure, or any other structural embodiment disclosed herein. The colloidal quantum well structure may be chosen based on a desired range of optical activity for the colloidal quantum well, a solution or suspension material that the colloidal quantum well may be disposed within and/or dispersed throughout, a desired polarization dependence for a plurality of colloidal quantum wells, quantum well excitation state lifetimes, or another factor. The suspension material may be an aerosol, a glass (e.g., silica), a liquid, an ionic solution, a solid material, a fluid material, a thin film, a polymer material, an organic solvent or another suspension material.

The primary excitation may be an excitation radiation, an electrical excitation, or an electrochemical excitation as described in embodiments herein. An excitation source, such as a laser, LED, voltage source, or other excitation source, may provide the primary excitation. A secondary excitation is then applied to the suspension material (block 204), and the colloidal quantum well structure therein, in the form of secondary radiation. The secondary excitation is selected to promote the colloidal quantum well structure from the first excitation state to the secondary excitation state. The colloidal quantum well undergoes an intersubband transition from the first excitation state to the second excitation state absorbing the secondary radiation and rendering the colloidal quantum well structure as opaque to the secondary radiation.

Alternatively, the method 220 of FIG. 15B provides a means for allowing a colloidal quantum well to transmit secondary radiation. The method 220 preventing a primary excitation exposure of the suspension material (block 222). The suspension material contains a colloidal quantum well structure with a ground state, a first excited state, and a second excited state. The primary radiation excites the colloidal quantum well structure into the first excitation state. The quantum well structure may be chosen to be a single monolayer, a plurality of monolayers, a single material, a plurality of materials, a core-shell structure, or any other structural embodiment disclosed herein. The colloidal quantum well structure may be chosen based on a desired range of optical activity for the colloidal quantum well, a solution or suspension material that the colloidal quantum well may be disposed within and/or dispersed throughout, a desired polarization dependence for a plurality of colloidal quantum wells, quantum well excitation state lifetimes, or another factor. The colloidal quantum well structure may be chosen for specific optically active wavelengths of interest, or for a band of desired optically active wavelengths for absorption and transmission. The suspension material may be an aerosol, a glass (e.g., silica), a liquid, an ionic solution, a solid material, a fluid material, a thin film, a polymer material, an organic solvent or another suspension material.

Preventing a primary excitation exposure of the suspension material may include turning off a radiation or light source, blocking, filtering, or otherwise preventing primary radiation from reaching the colloidal quantum well in the suspension material, removing a voltage or preventing the application of a voltage across the colloidal quantum well, stopping or preventing an electrochemical reaction, controlling a temperature of the colloidal quantum well structure, or another measure for preventing a primary excitation of the colloidal quantum well. A secondary excitation is then applied to the suspension material (block 224) and colloidal quantum well structure therein. The secondary excitation does not cause an intersubband transition of the colloidal quantum well structure, and is therefore not absorbed by the colloidal quantum well structure. The methods 200 and 220 of FIGS. 15A and 15B demonstrate the ability for actively controlling light absorption and transmission through a colloidal quantum well enabling dynamic optical switching.

Figure 16:
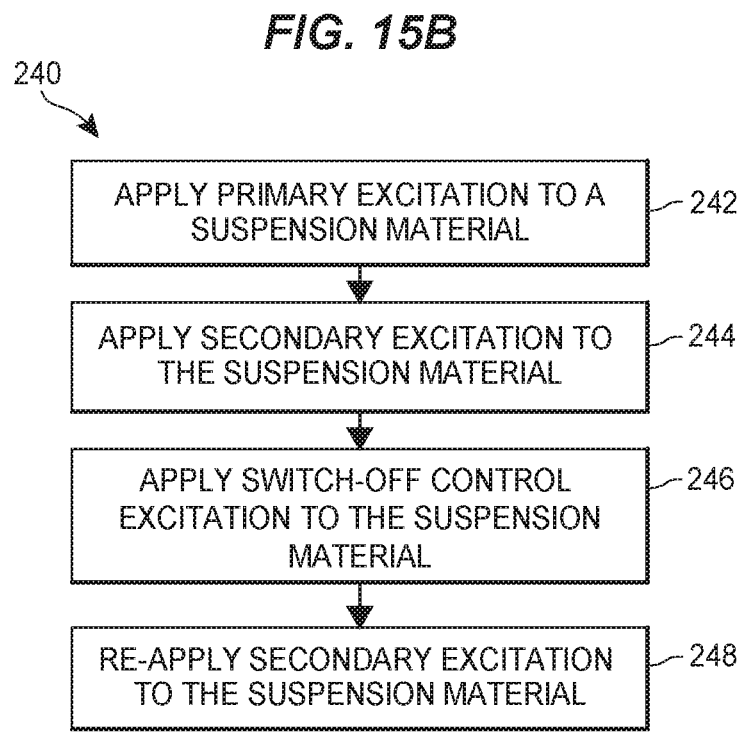
FIG. 16 is a flow diagram of a method for actively switching off an absorptive colloidal quantum well, enabling ultrafast optical switching of the colloidal quantum well.

FIG. 16 is a flow chart of an example method 240 for actively switching off an absorptive colloidal quantum well, enabling ultrafast optical switching of the colloidal quantum well. The method 240 includes providing a primary excitation to a suspension material (block 242). The suspension material contains a colloidal quantum well structure with a ground state, a first excited state, and a second excited state. The primary excitation excites the colloidal quantum well structure into the first excited state. The quantum well structure may be chosen to be a single monolayer, a plurality of monolayers, a single material, a plurality of materials, a core-shell structure, or any other structural embodiment disclosed herein. The colloidal quantum well structure may be chosen based on a desired range of optical activity for the colloidal quantum well, a solution or suspension material that the colloidal quantum well may be disposed within and/or dispersed throughout, a desired polarization dependence for a plurality of colloidal quantum wells, quantum well excitation state lifetimes, or another factor. The suspension material may be an aerosol, a glass (e.g., silica), a liquid, an ionic solution, a solid material, a fluid material, a thin film, a polymer material, an organic solvent or another suspension material.

The primary excitation may be an excitation radiation, an electrical excitation, or an electrochemical excitation as described in embodiments herein. An excitation source such as a laser, LED, voltage source, or other excitation source may provide the primary excitation. A secondary excitation is then applied to the suspension material (block 244) in the form of secondary radiation. The secondary excitation is selected to promote the colloidal quantum well structure from the first excitation state to the second excitation state. The colloidal quantum well undergoes an intersubband transition from the first excitation state to the second excitation state, absorbing the secondary radiation, and rendering the colloidal quantum well structure as opaque to the secondary radiation.

A switch-off control excitation is then applied to the suspension material (block 246) to de-excite the colloidal quantum cell structure back down into the ground state. A secondary excitation in the form of radiation may then be re-applied to the suspension material (block 248) and the colloidal quantum well structure therein. The re-applied secondary radiation transmits through the colloidal quantum well structure without causing an intersubband transition in the colloidal quantum well structure. The switch-off control excitation may be radiation that excites the colloidal quantum well structure into a state that has a faster decay lifetime, or radiation that induces de-excitation directly to the ground state. The method 240 of FIG. 16 is one embodiment of a method for enabling ultra-fast optical switching (i.e., on the sub-picosecond time scale).

The following list of aspects reflects a variety of the embodiments explicitly contemplated by the present application. Those of ordinary skill in the art will readily appreciate that the aspects below are neither limiting of the embodiments disclosed herein, nor exhaustive of all of the embodiments conceivable from the disclosure above, but are instead meant to be exemplary in nature 1. A method for controlling the optical transmissivity of a material, the method comprising applying a primary excitation to a suspension material having a suspended colloidal quantum well structure therein, the colloidal quantum well structure having a ground state, a primary excitation state, and a secondary excitation state, the secondary excitation state being a subband excitation state, and applying the primary radiation to excite the colloidal quantum well structure from the ground state to the primary excitation state; and applying a secondary excitation to the suspension material to promote the colloidal quantum well structure from the primary excitation state to the secondary excitation state, wherein the secondary excitation comprises secondary radiation.

2. The method of aspect 1, wherein selecting the colloidal quantum well structure comprises selecting a colloidal quantum well structure with an energy gap between the primary excitation state and secondary excitation state in the range of 0.7 to 0.9 eV.

3. The method of aspect 1, wherein selecting the colloidal quantum well structure comprises selecting a colloidal quantum well structure with an energy gap between the primary excitation state and secondary excitation state in the range of 0.8 to 1 eV.

4. The method of any one of aspects 1 to 3, wherein the primary excitation comprises a primary radiation.

5. The method of aspect 4, wherein the primary radiation has a wavelength in a range selected from the group consisting of 100-300 nm, 100-500 nm, 400-700 nm, 300-800 nm, and 500-1000 nm.

6. The method of aspect 4, wherein the primary radiation comprises visible radiation.

7. The method of aspect 4, wherein the primary radiation comprises ultraviolet radiation.

8. The method of any one of aspects 1 to 3, wherein the primary excitation comprises an electrical excitation.

9. The method of any one of aspects 1 to 3, wherein the primary excitation comprises an electro-chemical excitation.

10. The method of any one of aspects 1 to 9, wherein the secondary radiation comprises radiation with a wavelength between 1500 and 1600 nm.

11. The method of any one of aspects 1 to 9, wherein the secondary radiation comprises radiation with wavelength between 1250 and 1350 nm.

12. The method of any one of aspects 1 to 9, wherein the secondary radiation comprises infrared radiation.

13. The method of any one of aspects 1 to 12, wherein the colloidal quantum well structure comprises cadmium selenide.

14. The method of any one of aspects 1 to 13, wherein the colloidal quantum well structure comprises mercury selenide.

15. The method of any one of aspects 1 to 14, wherein the colloidal quantum well structure comprises zinc sulfide.

16. The method of any one of aspects 1 to 15, wherein the colloidal quantum well structure comprises a monolayer.

17. The method of any one of aspects 1 to 15, wherein the colloidal quantum well structure comprises five monolayers.

18. The method of any one of aspects 1 to 15, wherein the colloidal quantum well structure comprises six monolayers.

19. The method of any one of aspects 1 to 15, wherein the colloidal quantum well structure comprises a plurality of monolayers.

20. The method of any one of aspects 1 to 15, wherein the colloidal quantum well structure comprises ten or fewer monolayers.

21. The method of any one of aspects 1 to 20, wherein the colloidal quantum well structure comprises a core-shell quantum structure.

22. The method of any one of aspects 1 to 21, wherein the plurality of monolayers of the colloidal quantum well structure comprises a plurality of materials.

23. The method of any one of aspects 1 to 22, wherein the secondary excitation state has a sub-nanosecond decay rate.

24. The method of any one of aspects 1 to 22, wherein the secondary excitation state has a sub-picosecond decay rate.

25. The method of any one of aspects 1 to 24, wherein selecting a colloidal quantum well structure comprises selecting a colloidal quantum well structure having a ground state, a primary excitation state, a secondary excitation state, and a tertiary excitation state, the secondary and tertiary excitation states being subband excitation states.

26. The method of any one of aspects 1 to 25, further comprising: aligning a normal vector of multiple ones of a plurality of colloidal quantum well structures to a common axis, and wherein the promotion from the primary excitation state to the secondary excitation state is dependent on the polarization of the secondary radiation.

27. The method of any one of aspects 1 to 26, further comprising doping the colloidal quantum well with electron and hole accepting molecules.

28. The method of any one of aspects 1 to 27, further comprising applying a switch-off control excitation to the colloidal quantum well.

29. An optical device comprising: a suspension material; a colloidal quantum well structure suspended in the suspension material, the colloidal quantum well structure having a ground state, a primary excitation state, and a secondary excitation state, the secondary excitation state being a subband excitation state; a primary excitation source configured to provide a primary excitation to the colloidal quantum well structure; and a secondary excitation source configured to provide a secondary excitation to the colloidal quantum well structure, the secondary excitation selected to promote the colloidal quantum well structure from the primary excitation state to the secondary excitation state, wherein the secondary excitation comprises secondary radiation.

30. The optical device of aspect 29, wherein the colloidal quantum well structure comprises a colloidal quantum well structure with a primary excitation state to secondary excitation state energy gap in the range of 0.7 to 0.9 eV.

31. The optical device of aspect 29, wherein the colloidal quantum well structure comprises a colloidal quantum well structure with a primary excitation state to secondary excitation state energy gap in the range of 0.8 to 1 eV.

32. The optical device of any one of aspects 28 to 30, wherein the primary excitation comprises primary radiation.

33. The optical device of aspect 32, wherein the primary radiation has a wavelength in a range selected from the group consisting of 100-300 nm, 100-500 nm, 400-700 nm, 300-800 nm, or 500-1000 nm.

34. The optical device of aspect 32, wherein the primary radiation comprises visible radiation.

35. The optical device of aspect 32, wherein the primary radiation comprises ultraviolet radiation.

36. The optical device of any one of aspects 29 to 31, wherein the primary excitation comprises an electrical excitation.

37. The optical device of any one of aspects 29 to 31, wherein the primary excitation comprises an electro-chemical excitation.

38. The optical device of any one of aspects 29 to 37, wherein the secondary radiation comprises secondary radiation with a wavelength between 1500 and 1600 nm.

39. The optical device of any one of aspects 29 to 37, wherein the secondary radiation comprises radiation with a wavelength between 1250 and 1350 nm.

40. The optical device of any one of aspects 29 to 37, wherein the secondary radiation comprises infrared radiation.

41. The optical device of any one of aspects 29 to 40, wherein the colloidal quantum well structure comprises cadmium selenide.

42. The optical device of any one of aspects 29 to 41, wherein the colloidal quantum well structure comprises mercury selenide.

43. The optical device of any one of aspects 29 to 42, wherein the colloidal quantum well structure comprises zinc sulfide.

44. The optical device of any one of aspects 29 to 43, wherein the colloidal quantum well structure comprises a monolayer.

45. The optical device of any one of aspects 29 to 43, wherein the colloidal quantum well structure comprises five monolayers.

46. The optical device of any one of aspects 29 to 43, wherein the colloidal quantum well structure comprises six monolayers.

47. The optical device of any one of aspects 29 to 43, wherein the colloidal quantum well structure comprises a plurality of monolayers.

48. The optical device of any one of aspects 29 to 43, wherein the colloidal quantum well structure comprises ten or fewer monolayers.

49. The optical device of any one of aspects 29 to 48, wherein the colloidal quantum well structure comprises a core-shell quantum structure.

50. The optical device of any one of aspects 29 to 49, wherein the plurality of monolayers of the colloidal quantum well structure comprises a plurality of materials.

51. The optical device of any one of aspects 29 to 50, wherein the secondary excitation state has a sub-nanosecond decay rate.

52. The optical device of any one of aspects 29 to 50, wherein the secondary excitation state has a sub-picosecond decay rate.

53. The optical device of any one of aspects 29 to 52, wherein the colloidal quantum well structure comprises a colloidal quantum well structure having a ground state, a primary excitation state, a secondary excitation state, and a tertiary excitation state, the secondary and tertiary excitation states being subband excitation states.

54. The optical device of any one of aspects 29 to 53, further comprising a plurality of colloidal quantum well structures each having a normal vector aligned to a common axis, and wherein promotion from the primary excitation state to the secondary excitation state is dependent on the polarization of the secondary radiation.

55. The optical device of any one of aspects 29 to 54, wherein the suspension material comprises a thin film.

56. The optical device of any one of aspects 29 to 54, wherein the suspension material comprises an aerosol.

57. The optical device of any one of aspects 29 to 54, wherein the suspension material comprises silica.

58. The optical device of any one of aspects 29 to 54, wherein the suspension material comprises a fluid material.

59. The optical device of any one of aspects 29 to 54, wherein the suspension material comprises a solid material.

60. The optical device of any one of aspects 29 to 59, further comprising an electrical connection to the suspension material.

61. The optical device of any one of aspects 29 to 60 further comprising dopants in the colloidal quantum well, the dopants being electron and hole accepting molecules.

62. The optical device of any one of aspects 29 to 61 further comprising a switch-off control excitation source configured to supply a switch-off control excitation to the colloidal quantum well.

What is claimed:

1. An optical device comprising:
   a suspension material;
   a colloidal quantum well structure suspended in the suspension material, the colloidal quantum well structure having a ground state, a primary excitation state, and a secondary excitation state, the secondary excitation state being a subband excitation state;
   a primary excitation source configured to provide a primary excitation to the colloidal quantum well structure; and
   a secondary excitation source configured to provide a secondary excitation to the colloidal quantum well structure, the secondary excitation selected to promote the colloidal quantum well structure from the primary excitation state to the secondary excitation state, wherein the secondary excitation comprises secondary radiation.

2. The optical device of claim 1, wherein the primary excitation comprises primary radiation.

3. The optical device of claim 1, wherein the primary excitation comprises an electro-chemical excitation.

4. The optical device of claim 1, wherein the primary excitation comprises an electrical excitation.

5. The optical device of claim 4, further comprising an electrical connection to the suspension material.

6. The optical device of claim 1, wherein the colloidal quantum well structure comprises a material selected from the group consisting of cadmium selenide, mercury selenide, and zinc sulfide.

7. The optical device of claim 1, wherein the colloidal quantum well structure comprises a monolayer.

8. The optical device of claim 1, wherein the colloidal quantum well structure comprises a plurality of monolayers.

9. The optical device of claim 8, wherein the plurality of monolayers of the colloidal quantum well structure comprises a plurality of materials.

10. The optical device of claim 1, wherein the suspension material comprises a material selected from the group of a thin film, an aerosol, silica, a fluid material, and a solid material.

11. The optical device of claim 1, further comprising:
dopants in the colloidal quantum well, the dopants being electron and hole accepting molecules; and
a switch-off control excitation source configured to supply a switch-off control excitation to the colloidal quantum well.

12. A method for controlling the optical transmissivity of a material, the method comprising:
applying a primary excitation to a suspension material having a suspended colloidal quantum well structure therein, the colloidal quantum well structure having a ground state, a primary excitation state, and a secondary excitation state, the secondary excitation state being a subband excitation state, and applying the primary radiation to excite the colloidal quantum well structure from the ground state to the primary excitation state; and
applying a secondary excitation to the suspension material to promote the colloidal quantum well structure from the primary excitation state to the secondary excitation state, wherein the secondary excitation comprises secondary radiation.

13. The method of claim 12, wherein the primary excitation comprises a primary radiation.

14. The method of claim 13, wherein the primary radiation has a wavelength in a range selected from the group consisting of 100-300 nm, 100-500 nm, 400-700 nm, 300-800 nm, and 500-1000 nm.

15. The method of claim 12, wherein the primary excitation comprises an electrical excitation.

16. The method of claim 12, wherein the primary excitation comprises an electro-chemical excitation.

17. The method of claim 12, wherein the secondary radiation comprises radiation with a wavelength between 1500 and 1600 nm.

18. The method of claim 12, wherein the secondary radiation comprises radiation with wavelength between 1250 and 1350 nm.

19. The method of claim 12, wherein the colloidal quantum well structure comprises a material selected from the group consisting of cadmium selenide, mercury selenide, and zinc sulfide.

20. The method of claim 12, further comprising doping the colloidal quantum well with electron and hole accepting molecules and applying a switch-off control excitation to the suspension material containing the colloidal quantum well structure.

* * * * *